(12) United States Patent
Harvey et al.

(10) Patent No.: US 8,919,391 B1
(45) Date of Patent: Dec. 30, 2014

(54) MULTILAYERED BLADDER AND CARBON SCRUBBER FOR STORAGE TANK

(75) Inventors: James F. Harvey, Weiman, TX (US); Pete K. Alvarez, Pasadena, CA (US); Rodney Scott Holland, Deer Park, TX (US); Rodney Scott Holland, Jr., Deer Park, TX (US); John Bilke, Katy, TX (US); Tommy Garcia, Houston, TX (US); Jon Daniel, Victoria, TX (US)

(73) Assignee: Hydrochem LLC, Atlanta, GA (US)

( * ) Notice: Subject to any disclaimer, the term of this patent is extended or adjusted under 35 U.S.C. 154(b) by 651 days.

(21) Appl. No.: 12/961,913

(22) Filed: Dec. 7, 2010

Related U.S. Application Data

(60) Provisional application No. 61/267,333, filed on Dec. 7, 2009, provisional application No. 61/370,748, filed on Aug. 4, 2010.

(51) Int. Cl.
  *B65D 90/04* (2006.01)
  *B65F 3/14* (2006.01)

(52) U.S. Cl.
  CPC ............... *B65D 90/046* (2013.01); *B65F 3/14* (2013.01)
  USPC ................................ 141/65; 141/98; 141/231

(58) Field of Classification Search
  CPC ............ B65D 90/046; B65F 3/14; B65F 3/24
  USPC ........................ 141/65, 93, 98, 231
  See application file for complete search history.

(56) References Cited

U.S. PATENT DOCUMENTS

| | | | |
|---|---|---|---|
| 2,664,911 A | 1/1954 | Thompson et al. | |
| 2,836,963 A | 6/1958 | Fox | |
| 3,315,611 A | 4/1967 | Thompson | |
| 3,621,893 A * | 11/1971 | Nishimura et al. | 141/65 |
| 3,680,560 A | 8/1972 | Pannier, Jr. et al. | |
| 3,866,474 A | 2/1975 | Hasselmann | |
| 3,949,720 A | 4/1976 | Zipprich et al. | |
| 4,082,124 A | 4/1978 | Jenkins | |
| 4,213,479 A | 7/1980 | Pearson | |
| 4,461,402 A | 7/1984 | Fell et al. | |
| 4,681,571 A | 7/1987 | Nehring | |
| 4,793,386 A * | 12/1988 | Sloan | 141/65 |
| 4,796,676 A | 1/1989 | Hendershot et al. | |
| 5,038,960 A | 8/1991 | Seery | |
| 5,067,636 A | 11/1991 | Pfeiffer et al. | |
| 5,147,182 A * | 9/1992 | Timmons | 417/234 |
| 5,183,086 A | 2/1993 | Fanta et al. | |
| 5,234,419 A | 8/1993 | Bryant et al. | |
| 5,279,602 A | 1/1994 | Middaugh et al. | |
| 5,282,550 A | 2/1994 | Coleman | |
| 5,397,020 A | 3/1995 | Witt | |
| 5,505,327 A | 4/1996 | Witt | |
| 5,555,997 A | 9/1996 | Nogles | |
| 5,613,622 A | 3/1997 | Surrena et al. | |
| 5,636,760 A | 6/1997 | Yamamoto et al. | |
| 5,642,834 A * | 7/1997 | Shaw et al. | 220/720 |
| 5,649,573 A * | 7/1997 | Crum et al. | 141/67 |

(Continued)

*Primary Examiner* — Nicolas A Arnett
(74) *Attorney, Agent, or Firm* — Greenberg Traurig, LLP

(57) ABSTRACT

An apparatus and method for collection and containment of collected materials is provided. The apparatus can include a vacuum truck with at least one vacuum tank disposed thereon, the vacuum tank having a hollow interior region. A flexible bladder can be disposed within the hollow interior region of the vacuum tank. The bladder can be impermeable to and compatible with the collected material and capable of containing the material therewithin.

10 Claims, 6 Drawing Sheets

(56) References Cited

U.S. PATENT DOCUMENTS

| | | | |
|---|---|---|---|
| 5,996,171 A * | 12/1999 | Bowers | 15/340.1 |
| 6,224,345 B1 | 5/2001 | Dussault | |
| 6,286,700 B1 | 9/2001 | Davidson | |
| 6,508,363 B1 | 1/2003 | Crevasse | |
| 6,681,789 B1 | 1/2004 | Moulis et al. | |
| 6,805,173 B2 * | 10/2004 | Healy | 141/59 |
| 6,988,639 B2 | 1/2006 | Arch | |
| 7,013,924 B1 | 3/2006 | Meyers et al. | |
| 7,086,429 B2 | 8/2006 | Moizumi | |
| 7,121,304 B2 * | 10/2006 | Gray, Jr. | 138/30 |
| 7,128,838 B2 | 10/2006 | Dorin et al. | |
| 7,147,689 B1 | 12/2006 | Miller | |
| 7,243,478 B2 * | 7/2007 | Dawson et al. | 53/434 |
| 7,255,133 B2 | 8/2007 | Meyers et al. | |
| 7,506,776 B2 | 3/2009 | Podd | |
| 2005/0040253 A1 | 2/2005 | Thornton | |
| 2005/0196331 A1 | 9/2005 | Dove | |
| 2007/0023438 A1 | 2/2007 | Kenneth, Jr. | |
| 2008/0271811 A1 | 11/2008 | Healy | |
| 2009/0242566 A1 | 10/2009 | Witheridge | |
| 2010/0112815 A1 * | 5/2010 | O'Dougherty et al. | 438/689 |
| 2011/0126936 A1 * | 6/2011 | Dawson et al. | 141/10 |

\* cited by examiner

MULTILAYERED BLADDER AND CARBON SCRUBBER FOR STORAGE TANK

RELATED APPLICATIONS

This Application claims the benefit, and priority benefit, of U.S. Provisional Patent Application Ser. No. 61/267,333, filed Dec. 7, 2009, entitled "Bladder System For Storage Tank," and U.S. Provisional Patent Application Ser. No. 61/370,748, filed Aug. 4, 2010, entitled "Bladder System With Carbon Scrubber For Storage Tank," both of which are incorporated herein in their entireties.

BACKGROUND

1. Field of Invention

The present subject matter relates generally to the field of reduction of materials emissions, and in particular, to a vacuum tank containing a flexible bladder for the containment of collected materials.

2. Description of the Related Art

Vacuum trucks, vacuum boxes and other similar vehicles or containers can be utilized to collect liquid materials. During the collection process, the materials sometimes produce vapor emissions that are discharged into the atmosphere. For example, these exhaust emissions may be discharged from a vacuum pump used to deliver the materials to the vacuum tank or vented from a valve or other opening on the vacuum tank. These exhaust emissions can contain harmful compounds such as benzene and hexane which can be harmful to the environment and cause health concerns. Federal, state and local regulations are requiring significant reductions of discharge of volatile organic compounds (VOCs) into the atmosphere. Thus, a reduction in the amount of these volatile materials emissions is desired.

Figure 1:
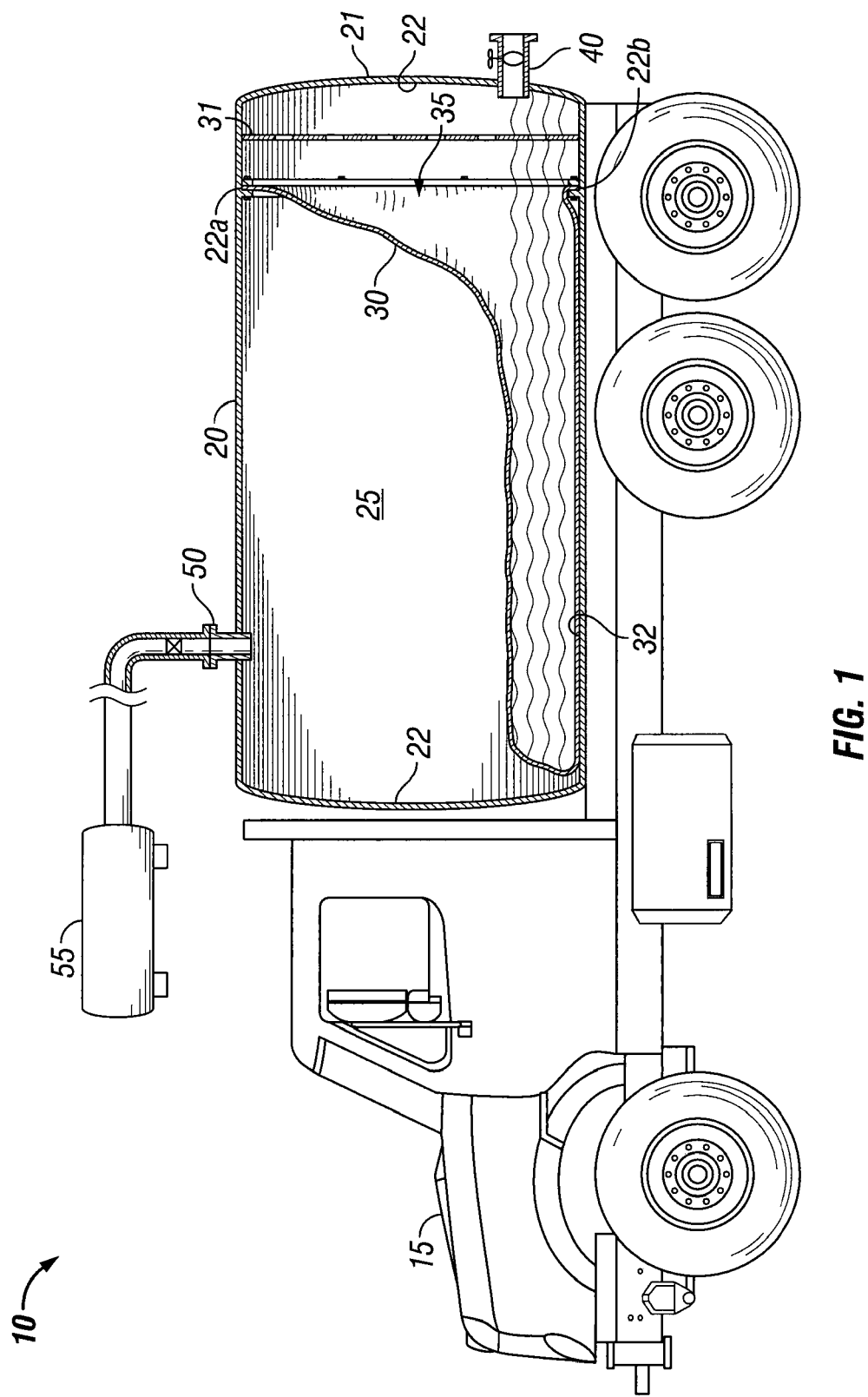
FIG. 1 is a side view of a vacuum tank with a collapsed bladder disposed against a bottom surface in an illustrative embodiment.
Figure 2:
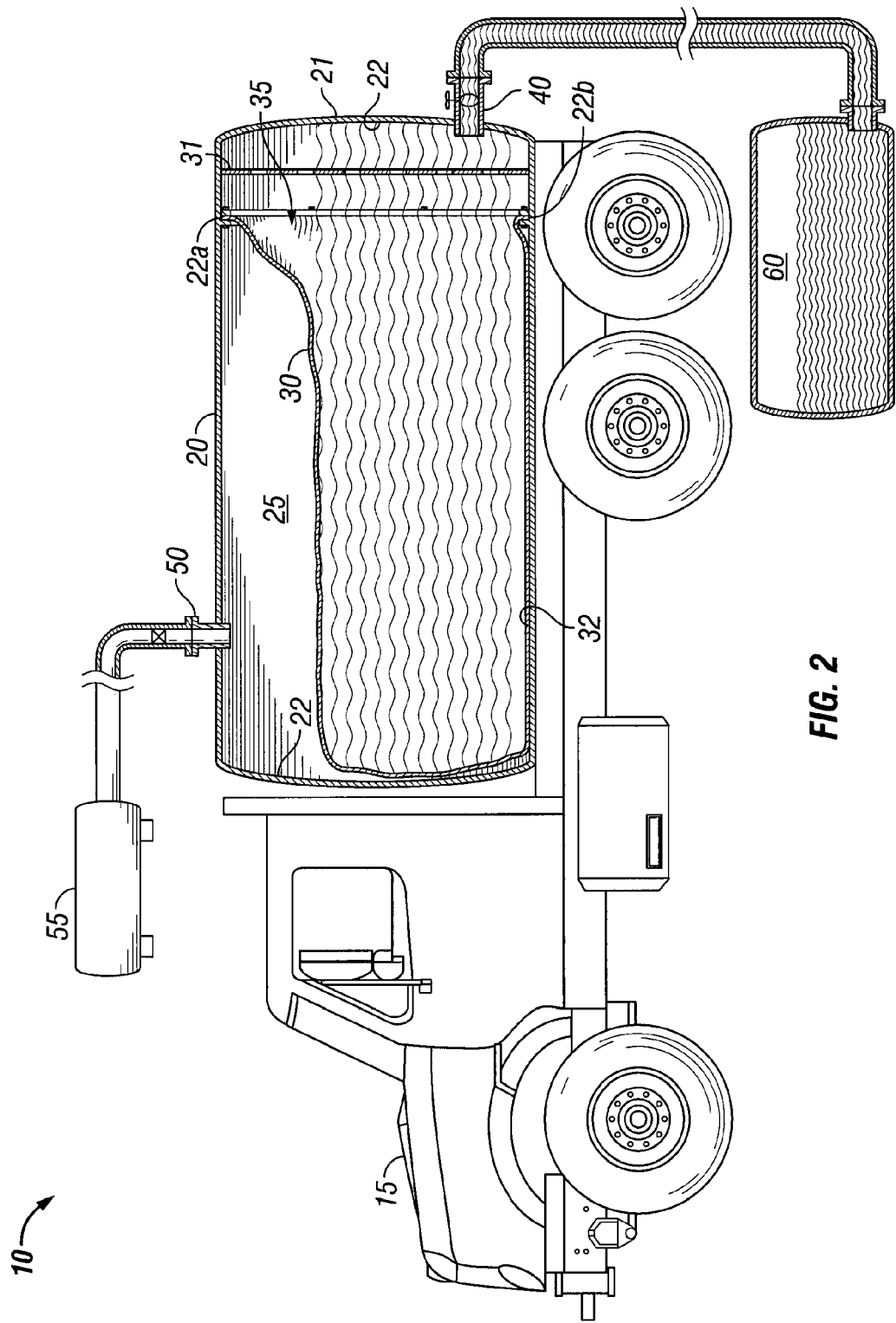
FIG. 2 is a side view of a vacuum tank with an expanded bladder in an illustrative embodiment.
Figure 3:
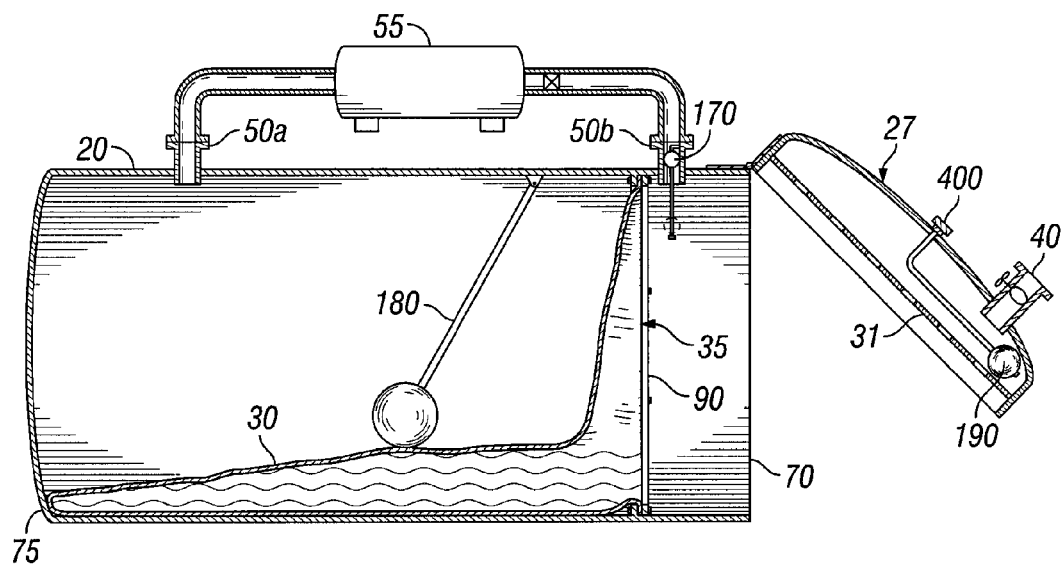
FIG. 3 is a side view of a vacuum tank with a collapsed bladder in an illustrative embodiment.
Figure 4:
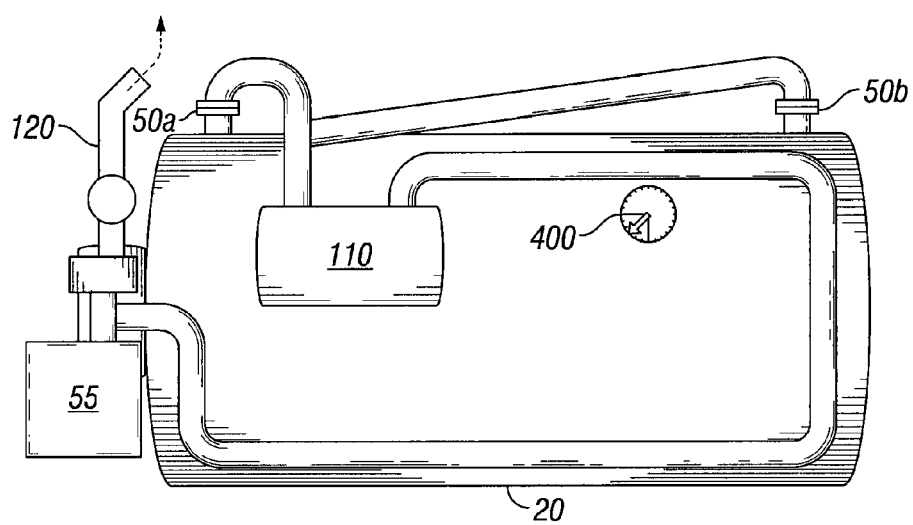
FIG. 4 is a side view of a vacuum tank exhaust system in an illustrative embodiment.
Figure 5:
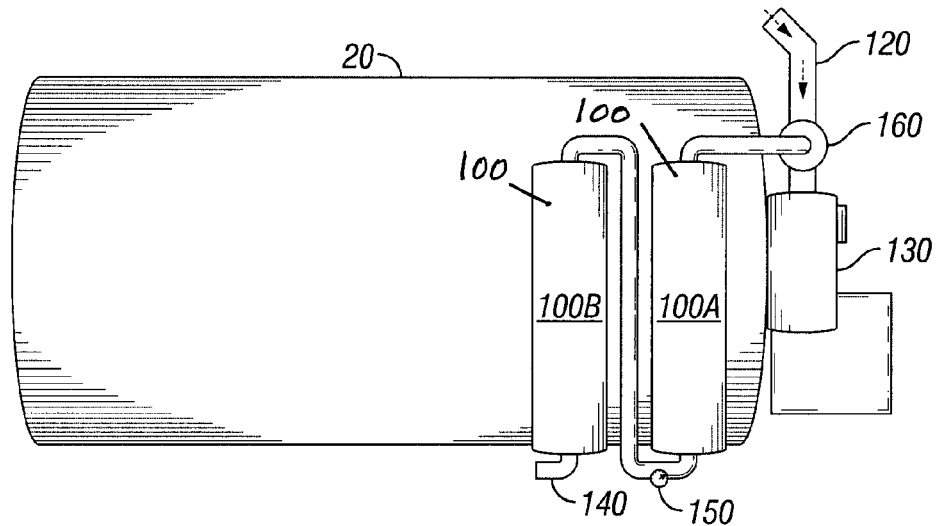
FIG. 5 is a side view of a vacuum tank having a carbon scrubber system for vacuum tank exhaust in an illustrative embodiment.

While certain embodiments will be described in connection with the preferred illustrative embodiments, it will be understood that it is not intended to limit the invention to those embodiments. On the contrary, it is intended to cover all alternatives, modifications, and equivalents, as may be included within the spirit and scope of the subject matter as defined by the claims provided herein.

SUMMARY

In accordance with the illustrative embodiments hereinafter described, an apparatus and method for collection and containment of collected materials is described.

In an illustrative embodiment, the apparatus can include, for example, a vacuum truck with at least one vacuum tank disposed thereon, the vacuum tank having a hollow interior region. A flexible bladder can be disposed within the hollow interior region of the vacuum tank. The bladder can be impermeable to and compatible with the collected material and capable of containing the material therewithin.

At least one opening can be formed in the bladder to allow the materials to enter or exit the bladder. The bladder can expand to collect and contain the materials. In an illustrative embodiment, the bladder can substantially conform to the dimensions of the hollow interior region of the vacuum tank when it is fully expanded.

An access port can be disposed on the vacuum tank to allow access to the hollow interior region of the tank. A vacuum pump can be attached to the access port to regulate the pressure of the hollow interior region of the tank, external to the bladder. When the vacuum is drawn on the hollow interior region, the bladder can expand to collect and contain the collected material therewithin.

The vacuum pump can be operable to pull a vacuum on the hollow interior region of the tank, external to the bladder. Further, the vacuum pump can be operable to pressurize or depressurize the hollow interior region of the tank, external to the bladder. The bladder can be impermeable to and compatible with the material. The bladder can be deflated when the vacuum pump pressurizes the hollow interior region of the tank and the external valve 40 is opened, external to the bladder, or inflated when the vacuum pump depressurizes the hollow interior region of the tank, external to the bladder.

The bladder can include at least one barrier layer that is impervious to permeation by the collected materials and at least one wear layer that is resistant to tearing. The bladder can also include one barrier layer and at least a pair of wear layers. The barrier layer can be disposed between the pair of wear layers. The barrier layer can also contact one or more of the pair of wear layers.

In certain of the present illustrative embodiments, the collected material is not released into the hollow interior region of the tank since the bladder is impermeable to and compatible with the collected material. Thus, the likelihood of any of the collected materials being released into the atmosphere from the hollow interior region is substantially reduced.

DETAILED DESCRIPTION

Referring now to FIGS. 1-10, illustrative embodiments of an apparatus and method for collection and containment of collected materials are provided.

Apparatus 10 can include at least one vacuum tank 20. In an illustrative embodiment, tank 20 can be disposed on a vacuum truck 15. Tank 20 can be formed of steel or other rigid material. Tank 20 can have an outer tank wall 21, an interior tank wall surface 22 and a hollow interior region 25. A bladder 30 can be disposed within hollow interior region 25. Bladder 30 can store liquid, solids and/or vapor materials. Examples of materials that can be collected and stored include, without limitation, acids, alkaline materials, and/or hydrocarbons such as straight run gasoline, sour naphtha, raffinate, jet fuel and platformate, and any related vapors and/or emissions. Further, the collected materials can be liquids, sludges or liquids containing particulate solid matter.

Bladder 30 can be impermeable to, and compatible with, the collected materials to prevent, or substantially prevent, the materials from passing into, or dispersing within, hollow interior region 25 of tank 20. Impermeable generally means some or all of the materials cannot pass through bladder 30, or are substantially or significantly unable to pass through bladder 30. Compatible generally means the materials will not react with or dissolve bladder 30 or the level of reacting or dissolving is substantially or significantly reduced. Bladder 30 can be utilized to collect and contain exhaust emissions from the collected materials and prevent the collected materials from being discharged to the atmosphere.

In certain illustrative embodiments, bladder 30 can be formed of a flexible material, so that bladder 30 generally conforms to the shape of the interior region 25 of tank 20 when bladder 30 is filled to, or near, capacity or otherwise engages or substantially engages the interior wall 22 of tank 20. In certain illustrative embodiments, bladder 30 can be deflated and lie against, or near, a rear wall 31 and/or a bottom surface 32 (FIG. 1) of tank 20 when bladder 30 is empty or substantially empty, and can expand in a balloon-type fashion to substantially conform to the shape of interior region 25 (FIG. 2) when bladder 30 is filled. In certain illustrative embodiments, bladder 30 can be detachably connected to an inner wall surface 22 of interior region 25 of tank 20 at a plurality of surface points 22a, 22b.

At least one opening 35 can be formed in bladder 30 to allow liquid or vapor materials to enter or exit bladder 30. Tank inlet 40 can be disposed in wall 21 of tank 20, whereby the liquid or vapor material can pass through tank inlet 40 when tank inlet 40 is open in order to enter or exit bladder 30 via opening 35. In certain illustrative embodiments, a vacuum can be drawn within interior region 25 of tank 20 to cause expansion of bladder 30 (See, e.g., FIG. 2). For example, tank 20 can have at least one vacuum pump connection 50 disposed thereon that is accessible to interior region 25. An external vacuum source, for example a vacuum pump 55, can be attached to vacuum pump connection 50 and utilized to draw a vacuum on interior region 25 of tank 20. When the vacuum is drawn on tank 20, liquid material can flow from the liquid source, for example, an industrial tank 60, through inlet 40 and into bladder 30 through opening 35. Bladder 30 can fill up and/or expand to collect the liquid material. In certain illustrative embodiments, any vapors, volatile emissions or other compounds emanating from the liquid material can be contained within bladder 30 without evacuating into interior region 25 through bladder 30. Thus, the likelihood of any environmentally detrimental or hazardous exhausts entering the atmosphere from interior region 25 can be substantially reduced.

In certain illustrative embodiments, interior region 25 of tank 20 can be pressurized to empty material out of bladder 30. External vacuum pump 55 can be utilized to introduce pressurized air into interior region 25 of tank 20 via vacuum pump connection 50. When interior region 25 is pressurized, liquid material can flow out of bladder 30 through opening 35 and tank inlet 40 and bladder 30 will empty and/or collapse. In a specific illustrative embodiment, vacuum pump connection 50 can be opened and liquid material can gravity-feed out of bladder 30 via opening 35 and tank inlet 40, without the need for pressurizing with external vacuum pump 55.

In an illustrative embodiment, tank 20 can have a first end 70 and a second end 75, and first end 70 can have a door 27 that can open to allow for cleaning of bladder 30. (See, e.g., FIG. 3). For example, opening of bladder 30 can be sized to substantially fit on, or around, a mounting ring 90 of tank 20. In certain illustrative embodiments where tank 20 has a rounded shape, opening 35 can be sized to fit around the circumference of mounting ring 90. Even when door 27 is open, the seal formed between opening 35 of bladder 30 and mounting ring 90 of tank 20 can prevent cleaning materials entering opening 35 of bladder 30 from accessing interior region 25 of tank 20. Bladder 30 can have a shape much like the interior region of tank 20, such that when door 27 is closed and a vacuum is pulled on interior region 25, bladder 30 can expand to substantially conform to the shape of interior region 25. When door 27 is opened, the interior of bladder 30 can be cleaned by engaging vacuum pump 55 to create a vacuum in interior region 25, such that bladder 30 can substantially conform to the shape of interior region 25 thus presenting a large opening inside bladder 30 which can be utilized for washout. In certain illustrative embodiments, bladder 30 can be detachable from mounting ring 90 such that bladder 30 can be removed from interior region 25 of tank 20 and tank 20 can be cleaned.

In certain illustrative embodiments (FIGS. 4 & 5), a carbon scrubber 100 can be utilized to capture and absorb any fugitive emissions that could potentially escape and/or exit through bladder 30 and/or exhaust of vacuum pump 55. The carbon scrubber 100 can be a back-up system for capturing escaping emissions that are not captured by bladder 30. A vacuum can be drawn on the interior of tank 20 using vacuum pump 55. In certain illustrative embodiments, a plurality of vacuum pump connections 50a, 50b can be utilized to connect vacuum pump 55 to tank 20. Fugitive emissions can be transported via exhaust line 120 to carbon scrubber 100. A plurality of carbon scrubbers 100a, 100b can be utilized. The vacuum stream can be vented to atmosphere via vent 140 after being treated and cleaned by scrubbers 100a, 100b. A monitor 150 can disposed at or near scrubbers 100a, 100b to measure content of fugitive emissions. A flame arrester 160 can be disposed at or near emissions line 120 to prevent back-flashing into tank 20. One or more knockout pots 110, 130 can be utilized to collect liquid condensation.

Figure 6:
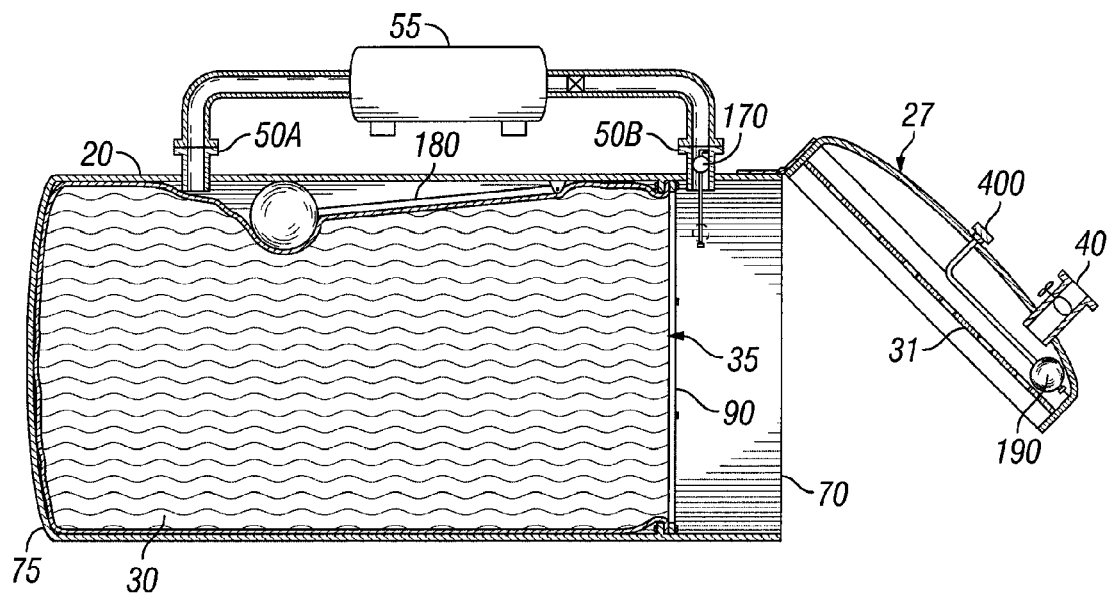
FIG. 6 is a side view of a vacuum tank with an expanded bladder in an illustrative embodiment.
Figure 7:
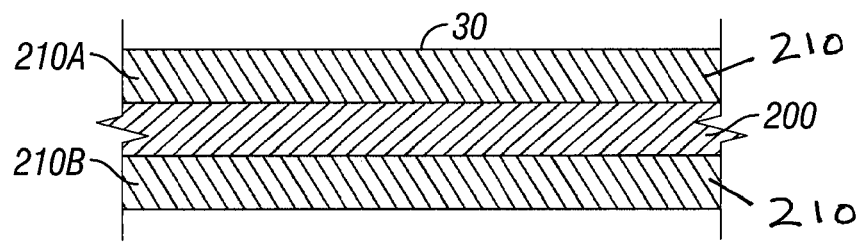
FIG. 7 is a side view of a bladder having a multilayered construction in an illustrative embodiment.
Figure 8:
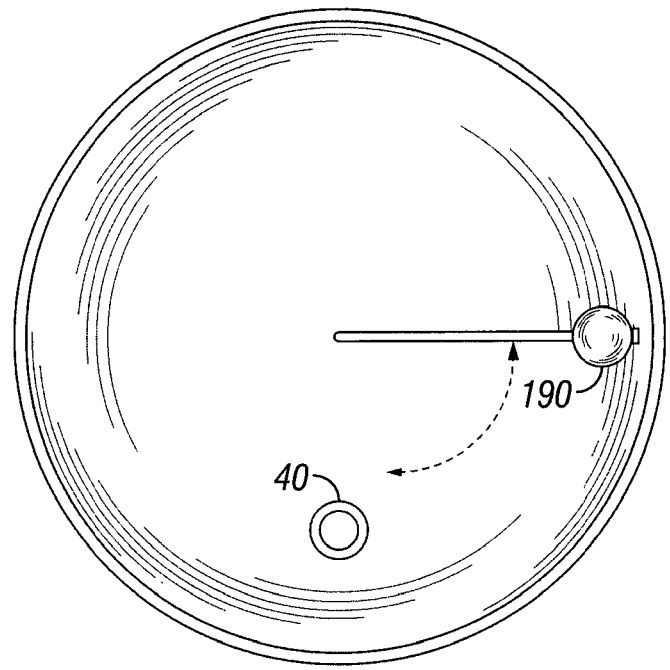
FIG. 8 is a front view of a door with a rear wall removed for a vacuum tank having a liquid level indicator disposed thereon in an illustrative embodiment.
Figure 9:
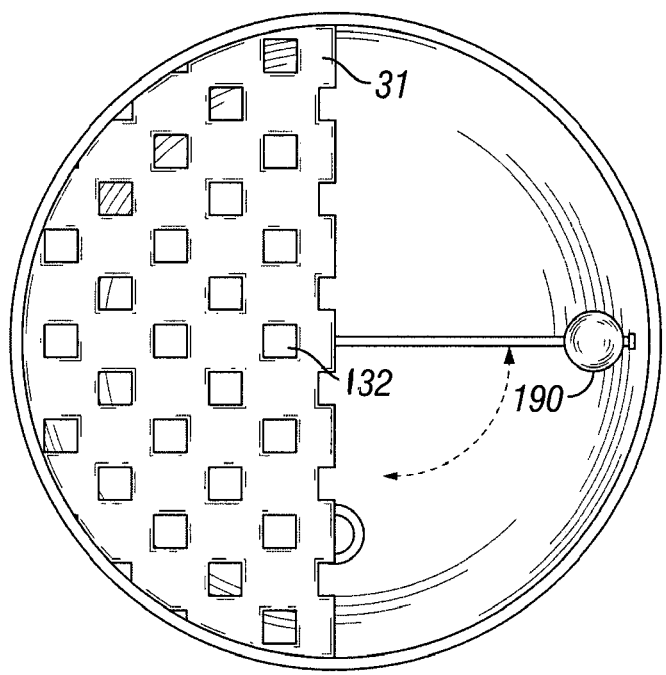
FIG. 9 is a front view of a rear wall (partially shown) for a vacuum tank with a door having a liquid level indicator disposed thereon in an illustrative embodiment.
Figure 10:
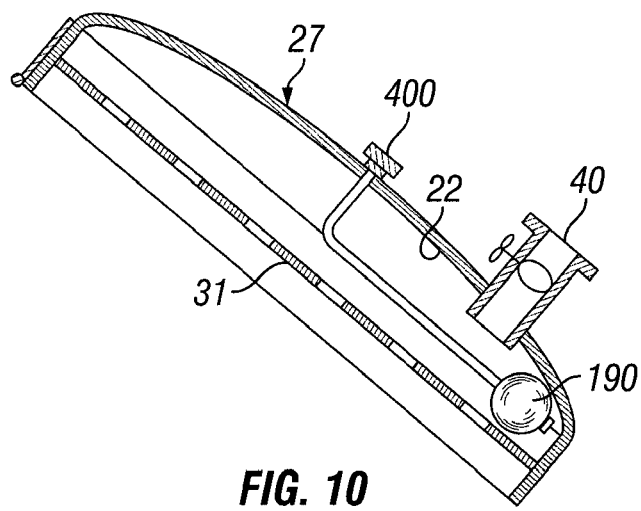
FIG. 10 is a side view of a door for a vacuum tank having a liquid level indicator disposed thereon in an illustrative embodiment.

As illustrated in FIG. 6, a float 170 can be disposed within vacuum pump connection 50 to seal and prevent liquid from exiting tank 20. In certain illustrative embodiments, a bladder level indicator 180 can be disposed exterior of bladder 30 within tank 20 to measure the bladder level within tank 20. A liquid level indicator 190 can be disposed at the interior of door 27 to measure the liquid level in bladder 30. Gauges 400 (see FIGS. 3, 4 & 6) can be disposed on the wall of tank 20 to allow a user to read the levels measured by bladder level indicator 180 and liquid level indicator 190.

In certain illustrative embodiments, rear wall 31 can be disposed at, or near, rear door 27 to cover and protect level indicator 190. (See FIGS. 6, 9 & 10). In an illustrative embodiment, rear wall 31 can be affixed to, and extend across the entire diameter of, rear door 27. One or more perforations 132 can be formed in rear wall 31. Perforations 132 can allow liquid and/or vapor to flow through rear wall 31, while filtering unwanted solid materials.

Prior to beginning certain vacuuming operations, it may be necessary to deflate bladder 30 within tank 20. (See, e.g., FIG. 1). This can be done, for example, by utilizing vacuum pump 55 to provide air pressure on the outer surface of bladder 30. As bladder 30 is deflated, it can potentially press against rear wall 31 or interior tank wall surface 22, or components disposed thereon. If pressed too forcefully, bladder 30 could be torn or damaged, or bladder 30 could potentially crush or damage rear wall 31, wall surface 22 or the components disposed thereon.

In certain illustrative embodiments, bladder 30 can be formed of one or more materials that are impermeable to, and compatible with, the collected materials to prevent the materials from passing into, or dispersing within, hollow interior region 25 of tank 20. Bladder 30 can have a layered construction. For example, a barrier layer 200 can be formed of a material such as Teflon that is impervious, or substantially impervious, to permeation by the collected material within bladder 30. Also, a wear layer 210 can be formed of a material such as polyester/polyether polyurethane that is wear, tear, puncture and/or abrasion resistant. Wear layer 210 can also be coated with, or otherwise include, an anti-static material to prevent static build up. Any combination of one or more barrier layers 200 and one or more wear layers 210 can be utilized to provide bladder 30 with the desired properties. In an illustrative embodiment (see FIG. 7), barrier layer 200 can be disposed between a pair of wear layers 210a and 210b, such that bladder 30 can be impervious to permeation by the collected material, and also resist wear, tear, puncture and/or abrasion on both its exterior and interior surfaces. In an illustrative embodiment, barrier layer 200 can directly contact wear layers 210a and 210b. By positioning barrier layer 200 between one or more wear layers 210a and 210b, barrier layer 200 can be protected to the extent it is not wear or tear resistant.

According to the present illustrative embodiments, the collected materials can be deposited within bladder 30 and then transported within a facility or to a separate location for treatment, disposal, discharge or storage. The present illustrative embodiments are not limited to use with only mobile vehicles such as vacuum trucks. For example, any storage device, whether mobile or stationary, that is capable of utilizing bladder 30 to collect and contain materials under vacuum conditions would be in accordance with the present illustrative embodiments.

In the drawings and specification, there has been disclosed and described typical illustrative embodiments, and although specific terms are employed, the terms are used in a descriptive sense only and not for purposes of limitation. It will be apparent that various modifications and changes can be made within the spirit and scope of the subject matter as described in the foregoing specification. Accordingly, the subject matter is therefore to be limited only by the scope of the claims provided herein.

What is claimed is:

1. An apparatus for containment of collected materials, the apparatus comprising:
    at least one storage tank, the storage tank having a hollow interior region;
    a multilayered bladder disposed within the hollow interior region, the bladder being operable to contain the material therewithin, the bladder comprising a single barrier layer that is impervious to permeation by the collected materials and at least a pair of wear layer that are resistant to tearing, the single barrier layer being disposed between the wear layers and contacting the wear layers, and wherein at least one of the wear layers is coated with an anti-static material;
    at least one opening formed in the bladder to allow the materials to enter or exit the bladder;
    an access port disposed on the storage tank and accessible to the hollow interior region of the tank; and
    a vacuum pump attachable to the access port and operable to regulate the pressure of the hollow interior region of the tank, external to the bladder.

2. The apparatus of claim 1, wherein the vacuum pump is operable to pull a vacuum on the hollow interior region of the tank, external to the bladder.

3. The apparatus of claim 1, wherein the vacuum pump is operable to pressurize or depressurize the hollow interior region of the tank, external to the bladder.

4. The apparatus of claim 1, wherein the bladder is impermeable to and compatible with the material.

5. The apparatus of claim 1, wherein the bladder is deflated when the vacuum pump pressurizes the hollow interior region of the tank, external to the bladder.

6. The apparatus of claim 1, wherein the bladder is inflated when the vacuum pump depressurizes the hollow interior region of the tank, external to the bladder.

7. The apparatus of claim 1, whereby the barrier layer contacts the wear layers.

8. The apparatus of claim 1, wherein the storage tank is disposed on a vacuum truck.

9. The apparatus of claim 1, further comprising one or more carbon scrubbers disposed on an exhaust of the vacuum pump to absorb collected materials from the exhaust.

10. The apparatus of claim 1, wherein the single barrier layer is formed of polytetrafluoroethylene.

* * * * *